United States Patent
Vogelsang et al.

(10) Patent No.: US 11,022,054 B2
(45) Date of Patent: Jun. 1, 2021

(54) METHOD FOR DETERMINING THE CYLINDER AIR-CHARGE OF AN INTERNAL COMBUSTION ENGINE IN A NON-FIRED OPERATION

(71) Applicant: Volkswagen Aktiengesellschaft, Wolfsburg (DE)

(72) Inventors: Jan Vogelsang, Braunschweig (DE); Tobias Viereg, Meine (DE); Marcin Piorun, Wolfsburg (DE); Andre Shurkewitsch, Calberlah (DE); Heiko Sternberg, Wolfsburg (DE); Nikolaus Zimbalist, Edemissen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/001,622

(22) Filed: Aug. 24, 2020

(65) Prior Publication Data

US 2021/0054793 A1 Feb. 25, 2021

(30) Foreign Application Priority Data

Aug. 22, 2019 (DE) ..................... 10 2019 212 565.4

(51) Int. Cl.
  *F02D 41/18* (2006.01)
  *F02D 41/00* (2006.01)

(52) U.S. Cl.
  CPC ....... *F02D 41/0002* (2013.01); *F02D 41/009* (2013.01); *F02D 2200/0406* (2013.01); *F02D 2200/101* (2013.01); *F02D 2200/70* (2013.01)

(58) Field of Classification Search
  CPC ............... F02D 41/0002; F02D 41/009; F02D 2200/101; F02D 2200/70; F02D 2200/0406
  USPC ...... 123/399, 481, 198 F, 436; 701/103–105, 701/110, 112, 113
  See application file for complete search history.

(56) References Cited

U.S. PATENT DOCUMENTS

| 6,805,095 | B2 | 10/2004 | Sun et al. |
| 6,981,492 | B2 | 1/2006 | Barba et al. |
| 7,117,078 | B1 | 10/2006 | Gangopadhyay |

(Continued)

FOREIGN PATENT DOCUMENTS

| DE | 101 58 262 A1 | 6/2003 |
| DE | 103 49 490 A1 | 8/2004 |

(Continued)

*Primary Examiner* — Hai H Huynh
(74) *Attorney, Agent, or Firm* — Muncy, Geissler, Olds & Lowe, P.C.

(57) ABSTRACT

A method for determining the cylinder air-charge of an internal combustion engine in a non-fired operation, wherein a method for determining the cylinder air-charge in a fired operation is performed. According to the invention, provision is made that in the method for determining the cylinder air-charge in the fired operation, a correction factor is provided as a function of engine speed and engine load which adjusts the value of the cylinder air-charge determined by the method in the fired operation to the non-fired operation. Thus, the previously known methods can be improved and made more efficient, in particular in view of the deviations of up to 30% between the cylinder air-charge values in the non-fired operation and the modeled values of the fired operation.

12 Claims, 1 Drawing Sheet

(56) References Cited

U.S. PATENT DOCUMENTS

| | | |
|---|---|---|
| 7,380,447 B2 * | 6/2008 | Rollinger .............. G01M 15/09 |
| | | 73/114.32 |
| 7,946,162 B2 | 5/2011 | Vennettilli et al. |
| 9,670,854 B2 | 6/2017 | Jankovic |
| 10,100,761 B2 | 10/2018 | Karnik et al. |
| 10,167,793 B2 * | 1/2019 | Bartsch .................. F01N 13/08 |
| 10,260,441 B2 | 4/2019 | Kuroda et al. |
| 10,557,422 B2 | 2/2020 | Millich et al. |
| 2003/0220732 A1 | 11/2003 | Matthews et al. |
| 2006/0241849 A1 | 10/2006 | Gangopadhyay |
| 2014/0069376 A1 | 3/2014 | Matthews et al. |
| 2014/0069377 A1 | 3/2014 | Brennan et al. |

FOREIGN PATENT DOCUMENTS

| | | |
|---|---|---|
| DE | 103 62 028 B4 | 9/2009 |
| DE | 10 2006 018 594 B4 | 4/2011 |
| DE | 10 2015 120 034 A1 | 5/2016 |
| DE | 10 2015 210 761 A1 | 12/2016 |
| DE | 10 2013 217 250 B4 | 8/2018 |
| DE | 10 2018 103 317 A1 | 8/2018 |
| EP | 2 098 710 B1 | 7/2016 |
| EP | 3282114 A1 | 2/2018 |

* cited by examiner

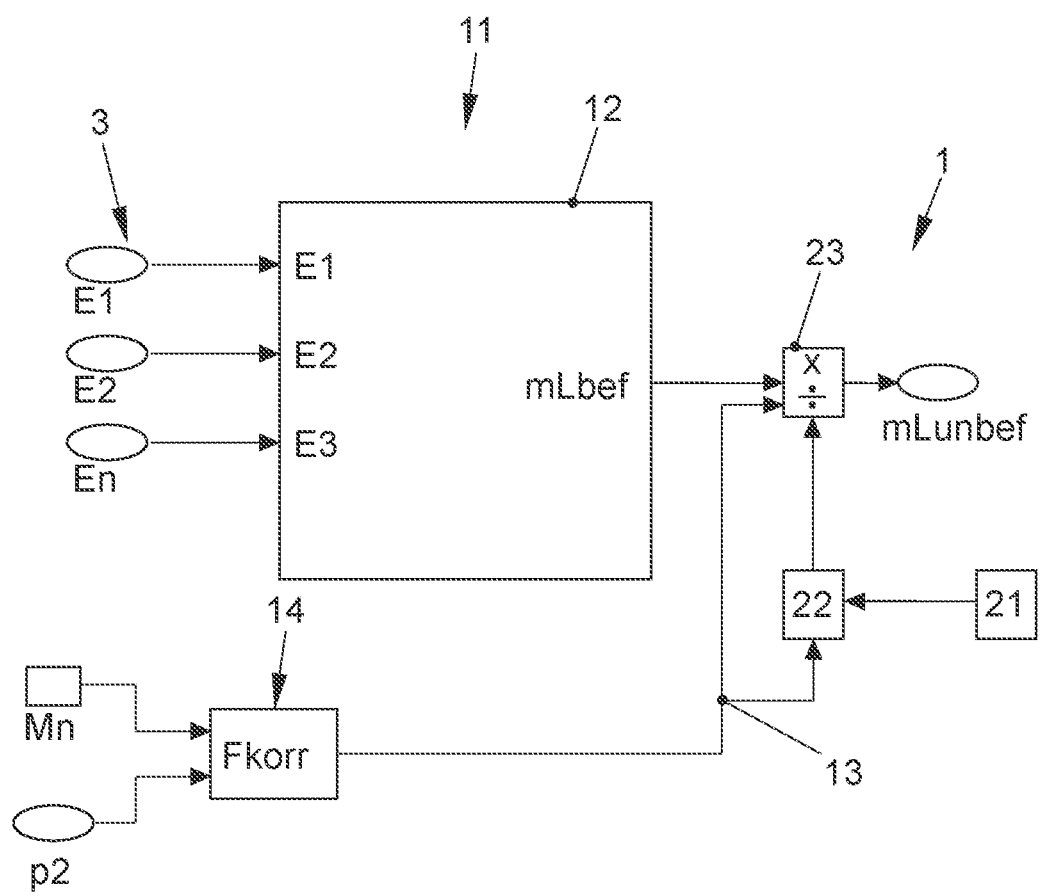

METHOD FOR DETERMINING THE CYLINDER AIR-CHARGE OF AN INTERNAL COMBUSTION ENGINE IN A NON-FIRED OPERATION

This nonprovisional application claims priority under 35 U.S.C. § 119(a) to German Patent Application No. 10 2019 212 565.4, which was filed in Germany on Aug. 22, 2019, and which is herein incorporated by reference.

BACKGROUND OF THE INVENTION

Field of the Invention

The present invention relates to. a method for determining a cylinder air-charge of an internal combustion engine in a non-fired operation.

Description of the Background Art

Non-fired operations of cylinders of an internal combustion engine in particular occur in overrun mode but also when the cylinder is deactivated. Cylinder deactivation in internal combustion engines offers the possibility of increasing the efficiency of internal combustion engines by reducing wall heat loss and charge cycle losses. In this case, it is particularly advantageous that by deactivating the cylinder the exhaust gas mass flow is reduced and the exhaust temperature is increased, which has a positive effect on the heat retention of the exhaust gas aftertreatment. In this way, high exhaust gas aftertreatment efficiency can be achieved.

Today's emissions legislation requires a more accurate modeling of the cylinder air-charge. The individual amount of the cylinder air-charge is one of the key parameters that contribute to the control of modern internal combustion engines in order to safely ensure efficient and emission-optimized operation. However, all previously known methods for determining the cylinder air-charge only stipulate fired operation, in which fuel is introduced into the cylinder in such a way that the air-fuel mixture is subsequently brought to combustion.

Thus, DE 101 58 262 A1 for example describes a generic method for determining a plurality of parameters by means of suitable models, which are introduced in the control of the engine and monitor and optimize the latter. In particular, the charge of the combustion chamber of the internal combustion engine with the supplied gas mixture formed of fresh air and recirculated exhaust gas is also simulated here using a physically based model.

DE 103 62 028 B4, which corresponds to U.S. Pat. No. 6,981,492, also describes a method for determining a quantity of fresh gas, taking into account a quantity of recirculated exhaust gas, which includes a temperature-based correction.

In another model-based method according to EP 2 098 710 B1, which corresponds to U.S. Pat. No. 7,946,162, the oxygen concentration in an internal combustion engine with exhaust gas recirculation is estimated, wherein one of the essential parameters used is the air mass entering into the cylinders as well as the estimation of the total gas flow entering the cylinder.

In the case of a non-fired operation, which occurs mainly in overrun phases and in particular in the case of the corresponding cylinder deactivation, the gas exchange takes place in the cylinders without the introduction of fuel and thus also without subsequent combustion. The lack of combustion results in a different air charge in the cylinder than in a fired operation under otherwise analogous conditions. Since previous models for cylinder air-charge model only the fired operation, these models do not represent the correct cylinder air-charge in a non-fired operation. This model error is also passed on to downstream systems in the engine control device. It was found that this can lead to a deviation of up to 30% between the model values and the actual values.

However, in order to comply with the legal limit values for exhaust gas emissions, exact models for the gas temperatures and component temperatures in the exhaust system are required. For the modeling of these temperatures, the mass flow through the cylinders, which is largely determined by the cylinder air-charge, is a main influencing variable so that inaccuracies in the determination of the cylinder air-charge lead to inaccuracies in the determination of these temperatures.

SUMMARY OF THE INVENTION

It is therefore an object of the present invention to provide a method for determining the cylinder air-charge, by means of which the operation of cylinders in the non-fired state can also be modeled. An integration with existing methods should preferably be possible.

Furthermore, it is an object of the present invention to provide an engine control device and also an internal combustion engine with such an engine control device, which is capable of determining a cylinder air-charge in a reliable and sufficiently precise manner with an acceptable time and cost also with respect to a non-fired operation of the cylinder.

The invention relates to a method for determining the cylinder air-charge of an internal combustion engine in a non-fired operation, wherein a method is performed for determining the cylinder air-charge in a fired operation. According to the invention, it is provided that in the method for determining the cylinder air-charge in a fired operation, a correction factor is provided as a function of engine speed and engine load, which correspondingly adjusts the value for the cylinder air-charge determined by the method in the fired operation to a non-fired operation.

In the context of the present invention, the term cylinder air-charge can be understood to be the amount of air present in the cylinder (in particular the air mass, number of air particles or the like, amount of oxygen, oxygen mass or number of oxygen particles).

According to the present invention, a value for the cylinder air-charge is first determined using a method which requires a cylinder in a fired operation. Many such methods for determining the cylinder air-charge of a cylinder in a fired operation are known. Conventionally, the cylinder air-charge can usually be calculated from a measured or modeled intake manifold pressure (also called boost pressure, which corresponds to the pressure of the air supplied to the cylinder), exhaust gas back pressure (also called exhaust gas pressure, which represents the pressure of the exhaust gas in an exhaust pipe) and models for the residual gas in the cylinder.

There are calculation algorithms, which include the current positions of actuators affecting the charge (e.g., intake and exhaust camshafts, charge movement flaps, valve lift and so forth), as well as intake air and exhaust gas temperatures. Inaccuracies of the models can be corrected by populating correction fields of the corresponding engine control software with data based on engine test bench measurements. Environmental factors such as pressure and temperature can also influence the actual and calculated cylinder air-charge. Environmental factors such as pressure and temperature can also be considered, for example by a model-based method, for example as described in DE 10 2015 210 761 A1, which corresponds to U.S. Pat. No. 10,557,422, which is incorporated herein by reference.

Further examples of suitable methods for determining the cylinder air-charge in a fired operation are explained in more detail in the following detailed description of the FIGURES.

According to the invention, it is provided that the value derived from the method for determining the cylinder air-charge is multiplied by a correction factor, which, as a function of the engine speed and the engine load, adjusts the value determined for the cylinder air-charge by the method in the fired operation to the non-fired operation.

In an embodiment of the invention, the intake manifold pressure is used as a characteristic value for the engine load.

Expressed in a formula, the adjustment step according to the invention yields:

$$mLunbef = mLbef \cdot Fkorr(Mn, p2)$$

with
mLunbef: amount of air in a non-fired cylinder
mLbef: amount of air in a fired cylinder
p2: intake manifold pressure
Mn: engine speed
Fkorr (Mn, p2): correction factor as a function of the engine speed Mn and the intake manifold pressure p2.

Studies conducted by the applicant have shown that the non-fired operation registers a strong influence due to the pressure drop via the intake valve. The state "cylinder pressure>intake manifold pressure" after combustion does not occur in a non-fired operation due to the lack of combustion. As a result, the engine can pull exhaust gas from the exhaust system back into the cylinder. This way, the cylinder can be completely charged with residual gas, which can be expelled again. In the non-fired operation, relatively high pressure amplitudes were determined in the exhaust gas pressure p3 value. Since not enough exhaust gas can be expelled through the closing exhaust valve, in the non-fired operation, the cylinder pressure may rise towards the end of the expulsion which can ultimately result in the cylinder having a lower air consumption in the subsequent step. These influences on determining the cylinder air-charge can now be taken into account by the inventive method and can be incorporated in a very efficient manner in the already-performed air-charge calculation algorithm for the fired operation of the cylinder.

The method can be carried out, e.g., in an engine control device of the internal combustion engine, in particular in a (software) module of the engine control device. The method can be designed as a computer-implemented method. The method can, e.g., be programmed to run in the engine control device. For this purpose, the engine control device can access a memory which contains instructions which are designed to carry out the method for determining the cylinder air-charge in the case of a fired and a non-fired operation.

The integration of the correction factor in the method for determining the cylinder air-charge in a fired operation can take place as a function of the position of a switch or a corresponding bit.

In an example of the invention, when switching between a fired operation and a non-fired operation, a ramping of, for example, an integrator-controlled correction factor is carried out. The ramping between a fired and a non-fired operation is particularly linear. The speed of the ramping can be controlled via parameters. A ramping can also be displayed using a characteristic curve or a linear equation.

The intake manifold pressure (also called boost pressure) and/or the exhaust gas pressure, may have been determined by measuring with suitable sensors or partly also by modeling.

In addition to the engine speed, the intake manifold pressure and the exhaust gas pressure can represent input variables for the method according to the invention.

The air-charge calculation algorithm can be performed in a conventional engine control device, both with regard to implementing the method for determining the cylinder air-charge in a fired operation and in a non-fired operation.

The air-charge calculation algorithm can have been created from physical/heuristic models with the aid of characteristic curves and using experimentally determined data.

The air-charge calculation algorithm of the method may include one or more additional input variables: positions of charge-influencing actuators, speed of the internal combustion engine, an intake cam position, an exhaust cam position, a charge movement flap position, at least one valve lift, an exhaust temperature, an air supply temperature, a measured or modeled exhaust pressure downstream of a turbine and/or an ambient temperature.

As a result, upon input of an intake manifold pressure and an exhaust gas pressure, the air-charge calculation algorithm can result in an amount of air which would be contained within the cylinder in case of a fired operation. If it is determined that one or more cylinders are in a non-fired operation, for example, in the overrun mode of the combustion engine or with a deactivated cylinder due to a low load, then the amount of air thus determined is adjusted by the correction factor which has been stored or calculated as the characteristic value at the applied engine speed and the current intake manifold pressure. This way, the amount of air in the cylinder at this point in time is determined much more precisely and can be used for subsequent control processes. This can improve the efficiency of the fired operation of the cylinder, which is subsequently resumed. However, as a result, improved efficiency of the exhaust gas treatment is also achieved since the now more accurate values can also contribute to more accurately detecting and controlling the temperatures, flow rates, loading capacity of the catalyst elements and other factors of the emission control.

Here, it is very advantageous that there is no need for an independent control and air mass detection algorithm, but that the inventive method can operate based on and using existing data and measurement devices.

The present invention further provides a method for controlling an internal combustion engine having at least one cylinder, the method steps comprising: performing a method for determining a cylinder air-charge in a fired operation; determining whether at least one cylinder switches to a non-fired operation, incorporating a correction factor which is determined as a function of engine speed and engine load; and introducing the corrected value for the cylinder air-charge in the further steps of the engine control.

The process can also optionally support the recirculation of residual exhaust gas.

Examples of further steps taken by the engine control can be an adjustment of the amount of supplied fresh air and/or the amount of exhaust flowing back into the cylinder.

An engine control device according to the invention has an input module and a processor (for example, comprising hardware and/or software). The input module is designed to receive at least one intake manifold pressure and exhaust gas pressure of a cylinder of an internal combustion engine and the engine speed, or to make these available within the engine control device. The processor is configured to perform an air-charge calculation algorithm which determines the cylinder air-charge in the fired operation. The processor is further configured to correct the cylinder air-charge as a function of engine speed and engine load, preferably determined by the intake manifold pressure, so as to determine a cylinder air-charge for the non-fired operation. Finally, the processor is configured to determine a fuel quantity and/or fresh air quantity to be introduced into the cylinder when the fired operation resumes, based on the determined amount of air (in particular based on the oxygen quantity of the determined amount of air).

The engine control device can be designed to perform or control a method according to any one of the preceding embodiments.

An internal combustion engine according to the invention (for example, a spark ignition engine, gasoline engine, diesel engine or natural gas engine and, optionally, comprising an additional electric motor) comprises at least one cylinder with an intake manifold and an exhaust pipe and an engine control device according to one of the specified embodiments. Here, the engine device is configured to determine an amount of air in the cylinder and based thereon, to determine an amount of fuel and/or amount of fresh air which, together with the amount of air, is to be introduced in the cylinder for combustion when the fired operation is resumed. For this purpose, the engine control device can control, for example, a fuel pump and an intake valve.

The invention also includes a computer program product with a program code, which is stored on a medium readable by a computer, for carrying out the methods described above as according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a highly schematic representation of a flow chart for the correction step of the cylinder air-charge in a preferred embodiment of the invention.

DETAILED DESCRIPTION

The FIGURE shows a schematic representation of a flow chart for the correction step in determining the cylinder air-charge in a preferred embodiment of the invention.

Embodiments of the present invention are focused on a method and a device, in particular an engine control device, which are able to determine a cylinder air-charge or an amount of air within a cylinder. The following equations Eq.1 to Eq.7 describe physical quantities, which are important for determining the amount of air within the cylinder in a fired operation.

$$mRG_{res} = \frac{p_3 * V_{AS}}{R_a * T_3} \quad \text{Gl.1}$$

$$mRG_{Reasp} = C * A * p_3 * \sqrt{\frac{1}{T_3} * \psi\left(\frac{p_2}{p_3}\right)} \quad \text{Gl.2}$$

$$mLSca = C * A * p_2 * \sqrt{\frac{1}{T_2} * \psi\left(\frac{p_3}{p_2}\right)} \quad \text{Gl.3}$$

$$p_{RG} = \frac{(mRG_{Res} + mRG_{Reasp} - mLsca) * T_{zyl}}{R_a * V_{ES}} \quad \text{Gl.4}$$

$$p_{zyl} = p2 \quad \text{Gl.5}$$

$$p_L = p_{zyl} - p_{RG} \quad \text{Gl.6}$$

$$mL = \frac{p_L * V_{ES}}{R_a * T_{zyl}} \quad \text{Gl.7}$$

The variables in equations Eq.1 to Eq.7 have the following meaning:
mRGres: residual gas
mRGreasp: reaspirative residual gas
p2: intake manifold pressure
mLsca: scavenging air mass
p3: exhaust gas pressure
T2: intake manifold temperature
T3: exhaust gas temperature
pzyl: cylinder pressure upon closing intake valve
Tzyl: temperature cylinder upon closing intake valve
pRG: partial pressure residual gas
pL: partial pressure air
VAS: cylinder volume upon closing exhaust valve
VES: cylinder volume upon closing intake valve
Ra: specific gas constant
A: effective area of valve overflow
C: constant
mL: air mass in the cylinder
pu: ambient pressure Eq.1 describes the amount of residual gas substantially as a function of the exhaust gas pressure p3. The correct detection of the residual gas quantity is a prerequisite for an exact determination of the cylinder air-charge. Conventionally, however, it is inaccessible to a direct measurement by a sensor system.

The residual gas remaining in the dead volume can be calculated from the corresponding cylinder volume VAS, the exhaust gas back pressure P3 and the exhaust gas temperature T3 in accordance with Eq. 1. With the process of internal residual gas recirculation or replacing the residual gas quantity with fresh air (scavenging), which is common in spark ignition engines, residual gas or fresh air flows through the cylinder between the intake manifold and the exhaust gas volume at the top dead center of the intake tract during the overlap phase of the intake and exhaust valve opening times. The amount of the overflowed residual gas, which is again retrieved into the cylinder in the further course of the intake tract, mainly depends on the pressure ratio between the exhaust pressure p3 and the intake manifold pressure p2 according to Eq. 2.

This applies analogously to the fresh air amount purged through the cylinder when there is a positive pressure drop between the intake manifold pressure and the exhaust gas pressure (see Eq. 3). It can be shown (Eq. 4 to Eq. 7) that with a uniform scaling of the intake manifold pressure p2 and the exhaust gas back pressure p3, the cylinder air-charge mL also scales linearly to the same extent.

If, e.g., Eq. 1 to Eq.7 are written as p2'=f·p2 and p3'=s·p3, instead of as p2, p3, then Eq. 7 amounts to: mL'=f·mL. With the intake valve closed, the amount of air in the cylinder thus scales the same way as the intake manifold pressure p2 and the exhaust gas pressure p3.

Eq.1 describes the amount of residual gas when the exhaust valve is closed. In Eq. 2 and Eq. 3, ψ denotes the throttle outflow function, which is provided as sqrt(k/(k−1) ·(x2/k−xk+1/k), wherein k is the adiabatic exponent. Eq. 5 is based on an approximation that there is a pressure equilibrium between the pressure in the intake manifold and the pressure in the cylinder when the intake valve is closed.

The fact that the intake manifold pressure, the exhaust gas back pressure and the cylinder air-charge linearly scale in the same way is not necessarily the basis of a method for determining an amount of air within a cylinder of an internal combustion engine in a fired operation.

Further methods for determining the cylinder air-charge in a fired operation are also known indirectly or directly from DE 101 58 262 A1, EP 2 098 710 B1 (which corresponds to US 2010/0005872 or from DE 103 62 028 B4 (which corresponds to U.S. Pat. No. 6,981,492), for example, which are all herein incorporated by reference.

The FIGURE shows a schematic representation of a module 1, which is designed to carry out a method for determining an amount of air within a cylinder according to an embodiment of the present invention, and which, e.g., can be included in an engine control device according to an embodiment of the present invention.

The module 1 comprises an input module 3, which is designed to obtain at least one intake manifold pressure P2 and the engine speed Mn, as well as further parameters essential for modeling the cylinder air-charge in the fired operation mLbef.

Further input variables are denoted by E1, E2, and En, and may, for example, comprise the exhaust gas pressure P3, an intake cam position and an exhaust cam position or other input variables such as the intake manifold temperature and exhaust gas temperature.

Further, the module 1 comprises a processor 11, which is configured to determine the cylinder air-charge in a fired operation mLbef from the various input variables using the air charge calculation algorithm 12.

Using a calculation element 14, a correction factor Fkorr is calculated using the input values of the engine speed Mn and the intake manifold pressure p2. According to the invention, provision is now made that upon querying 13 a non-fired operation of a cylinder, the value mLbef determined by the air-charge calculation algorithm 12 is adapted to the identified non-fired state of the cylinder by including the correction factor Fkorr, e.g., by multiplying or dividing the two values 23, and the corrected value mLunbef is determined.

In an exemplary embodiment, a bit 21 queries as to whether there is a transition from a non-fired operation to a fired operation of the cylinder. In light of the fact that irregularities could be found when switching between the two operating modes, an integrator-controlled ramping 22 of the correction factor Fkorr can be carried out upon detecting such a transition before said correction factor is used to calculate the value mLunbef in operation step 23. In this way it can be achieved that the irregularities when switching from a fired to a non-fired operation, or vice versa from a non-fired operation to a fired operation, are avoided or at least reduced.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for determining a cylinder air-charge of an internal combustion engine in a non-fired operation, the method comprising:
   determining a cylinder air-charge in a fired operation by providing a correction factor as a function of engine speed and engine load; and
   adjusting a value for the cylinder air-charge determined by the fired mode to the non-fired mode.

2. The method according to claim 1, wherein the intake manifold pressure is applied as a characteristic value for the engine load.

3. The method according to claim 1, wherein an inclusion of the correction factor in the method for determining the cylinder air-charge in a fired mode takes place as a function of the position of a switch or a corresponding bit 21.

4. The method according to claim 1, wherein, when switching between the fired mode and the non-fired mode, a ramping of the correction factor is carried out.

5. The method according to claim 1, wherein the air-charge calculation algorithm of the method comprises one or more further input variables: positions of charge-influencing actuators, speed of the internal combustion engine, intake cam position, exhaust cam position, charge movement flap position, at least one valve lift, exhaust gas temperature, air supply temperature, measured or modeled exhaust gas pressure downstream of a turbine and/or an ambient temperature.

6. The method according to claim 1, wherein the method supports residual gas recirculation.

7. The method according to claim 1, wherein the intake manifold pressure and the exhaust gas pressure are determined by pressure measurement or modeling, in particular by averaging pressure measurements or modeling, in an intake manifold or in an exhaust pipe.

8. An engine control device, which is designed to execute the method according to claim 1.

9. An internal combustion engine, which comprises the engine control device according to claim 8.

10. A computer program product with a program code which is stored on a medium readable by a computer for carrying out the method according to claim 1.

11. A method for controlling an internal combustion engine having at least one cylinder, the method comprising:
   performing a method for determining a cylinder air-charge in a fired operation;
   determining whether at least one cylinder switches to a non-fired operation;
   determining a correction factor as a function of engine speed and engine load; and
   introducing a corrected value for the cylinder air-charge in further steps of the engine control.

12. The method according to claim 11, wherein the amount of supplied fresh air and/or the quantity of the exhaust gases flowing back into the cylinder is adjusted.

* * * * *